(12) United States Patent
Dillon et al.

(10) Patent No.: US 11,352,214 B2
(45) Date of Patent: Jun. 7, 2022

(54) DIVERSION ASSEMBLY

(71) Applicant: ISO-Pacific Remediation Technologies, Inc., Richland, WA (US)

(72) Inventors: Michael John Dillon, Richland, WA (US); Lori Dillon, Richland, WA (US)

(73) Assignee: ISO-PACIFIC REMEDIATION TECHNOLOGIES, INC., Richland, WA (US)

( * ) Notice: Subject to any disclaimer, the term of this patent is extended or adjusted under 35 U.S.C. 154(b) by 0 days.

(21) Appl. No.: 17/168,924

(22) Filed: Feb. 5, 2021

(65) Prior Publication Data

US 2021/0237985 A1 Aug. 5, 2021

Related U.S. Application Data

(60) Provisional application No. 62/970,617, filed on Feb. 5, 2020.

(51) Int. Cl.
| | |
|---|---|
| B65G 47/20 | (2006.01) |
| B65G 11/02 | (2006.01) |
| B65G 11/12 | (2006.01) |
| B65G 33/10 | (2006.01) |
| B65G 33/26 | (2006.01) |
| B65G 43/08 | (2006.01) |
| B65G 15/28 | (2006.01) |

(52) U.S. Cl.
CPC ............ *B65G 47/20* (2013.01); *B65G 11/026* (2013.01); *B65G 11/126* (2013.01); *B65G 15/28* (2013.01); *B65G 33/10* (2013.01); *B65G 33/265* (2013.01); *B65G 43/08* (2013.01); *B65G 2203/042* (2013.01)

(58) Field of Classification Search
CPC .... B65G 47/20; B65G 11/026; B65G 11/126; B65G 11/20; B65G 11/203; B65G 11/206; B65G 15/28; B65G 33/10; B65G 33/265

See application file for complete search history.

(56) References Cited

U.S. PATENT DOCUMENTS

| | | | | |
|---|---|---|---|---|
| 1,428,763 | A * | 9/1922 | Davisson | B65G 11/026 |
| | | | | 193/31 R |
| 3,716,135 | A * | 2/1973 | Sears | B07C 5/366 |
| | | | | 209/655 |
| 3,780,890 | A * | 12/1973 | Glover | C21B 7/18 |
| | | | | 414/170 |
| 6,629,611 | B2 * | 10/2003 | Satake | B07C 5/3425 |
| | | | | 198/439 |
| 9,457,382 | B2 * | 10/2016 | Dillon | B07C 5/362 |

\* cited by examiner

*Primary Examiner* — William R Harp
(74) *Attorney, Agent, or Firm* — Davis Wright Tremaine LLP; Heather M. Colburn

(57) ABSTRACT

A diversion assembly for use with a feed material. The diversion assembly includes a plurality of movable gate chutes, a first conveyor, and a second conveyor. The plurality of movable gate chutes are each positionable in a retracted position and an extended position. The first conveyor is configured to carry, for each of any of the plurality of movable gate chutes in the retracted position, a first portion of the feed material to a first area. The second conveyor is configured to carry, for each of any of the plurality of movable gate chutes in the extended position, a second portion of the feed material to a second area. The second area is spaced apart from the first area.

22 Claims, 10 Drawing Sheets

DIVERSION ASSEMBLY

CROSS REFERENCE TO RELATED APPLICATION(S)

This application claims the benefit of U.S. Provisional patent Application No. 62/970,617, filed on Feb. 5, 2020, which is incorporated herein by reference in its entirety.

BACKGROUND OF THE INVENTION

Field of the Invention

The present invention is directed generally to diversion assemblies.

Description of the Related Art

FIGS. 1A and 1B illustrate a Segmented Gate System ("SGS") provided by Eberline Services Inc. ("Eberline"). This system was developed in the 1980's for a Department of Defense cleanup project on Johnston Atoll. FIG. 1A depicts one of four units used on Johnston Atoll. In FIG. 1A, a single gate is shown in an extended position next to an empty survey belt for illustrative purposes. All other gates are shown in a retracted position. Eberline decommissioned the units on Johnston Atoll in 1998.

Eberline built a similar system for use in the continental United States ("CONUS"), but found that, as designed, the CONUS system could not be used successfully in highly plastic clay soils. FIG. 1B depicts a unit of the CONUS system. In FIG. 1B, soil is pictured falling off a survey belt and into an extended array of gates for diversion. Eberline decommissioned the CONUS system in 2010.

A unit of the SGS included pneumatic cylinders that actuated gates and allowed the soil to fall onto one of two belt conveyors positioned below the system. Each pneumatic cylinder was equipped with magnetically operated position indicators that relayed gate position back to a SGS process computer. The gates were arranged in a gate array that was driven by electronic signals. The electronic signals were provided to a relay board, which controlled a bank of pneumatic valves in a pressurized manifold. Air hoses from the manifold, fed based on the valve position, selectively sent air to one end or the other end of the pneumatic cylinder, which caused the cylinder's piston to move forward or backward. A gate chute was bolted to this piston. Piston travel speed was controlled by adjusting metering valves on the inlet side of the main valve and by the pressure setting of the air supply provided by a large compressor. Unfortunately, the many electrical and pneumatic control components of this complex system were prone to failure, and constant adjustment and recalibration was required for the gates to actuate at the correct time to accomplish diversion successfully.

BRIEF DESCRIPTION OF THE SEVERAL VIEWS OF THE DRAWING(S)

Various embodiments in accordance with the present disclosure will be described with reference to the following drawings.

Figure 1A:
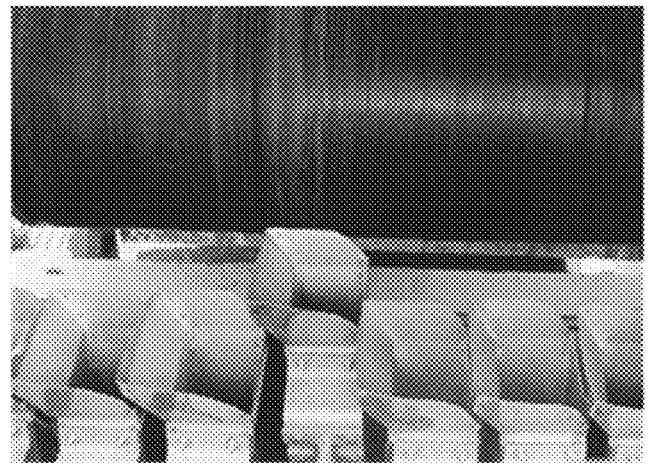
FIG. 1A is a first photograph of a Segmented Gate System ("SGS") provided by Eberline Services Inc. ("Eberline").
Figure 1B:
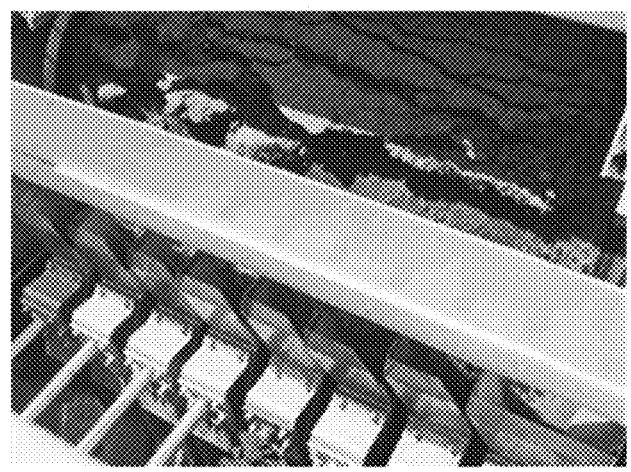
FIG. 1B is a second photograph of the SGS of FIG. 1A.
Figure 2:
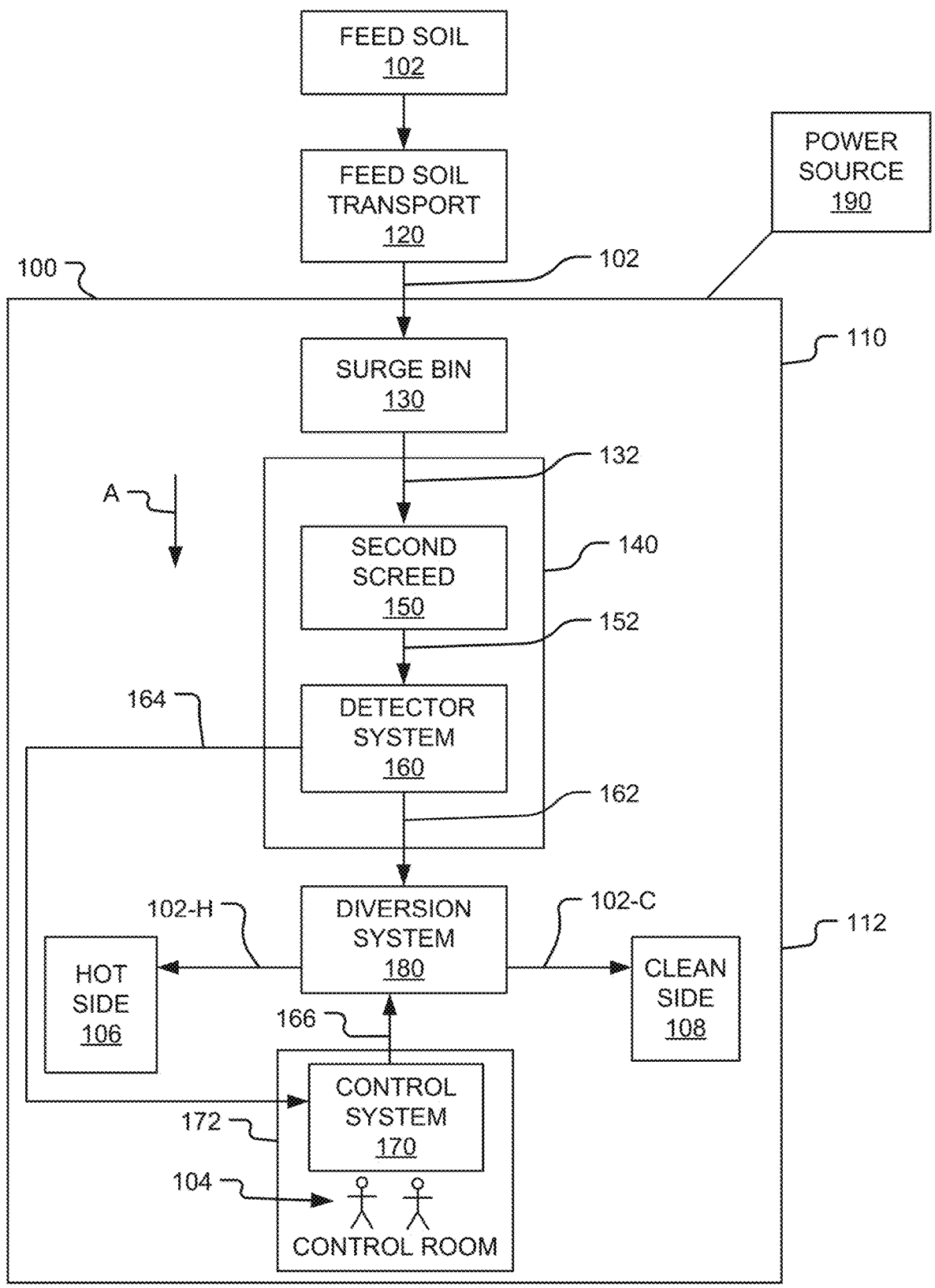

FIG. 2 is a reproduction of FIG. 1 from U.S. Pat. No. 9,457,382, which illustrates a system that includes a diversion system.

Figure 3:
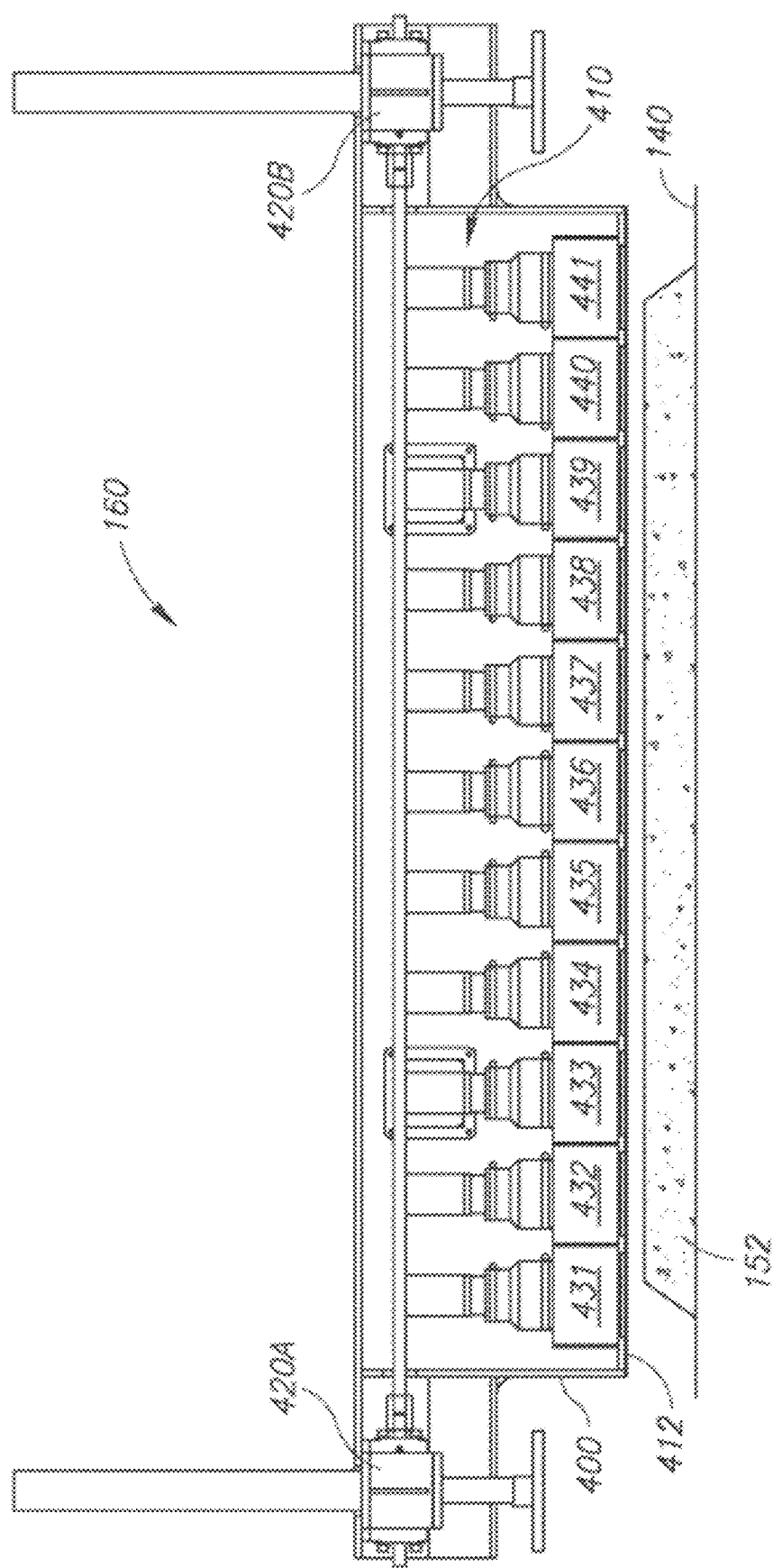

FIG. 3 is reproduction of FIG. 4A from U.S. Pat. No. 9,457,382, which illustrates a detector system.

Figure 4:
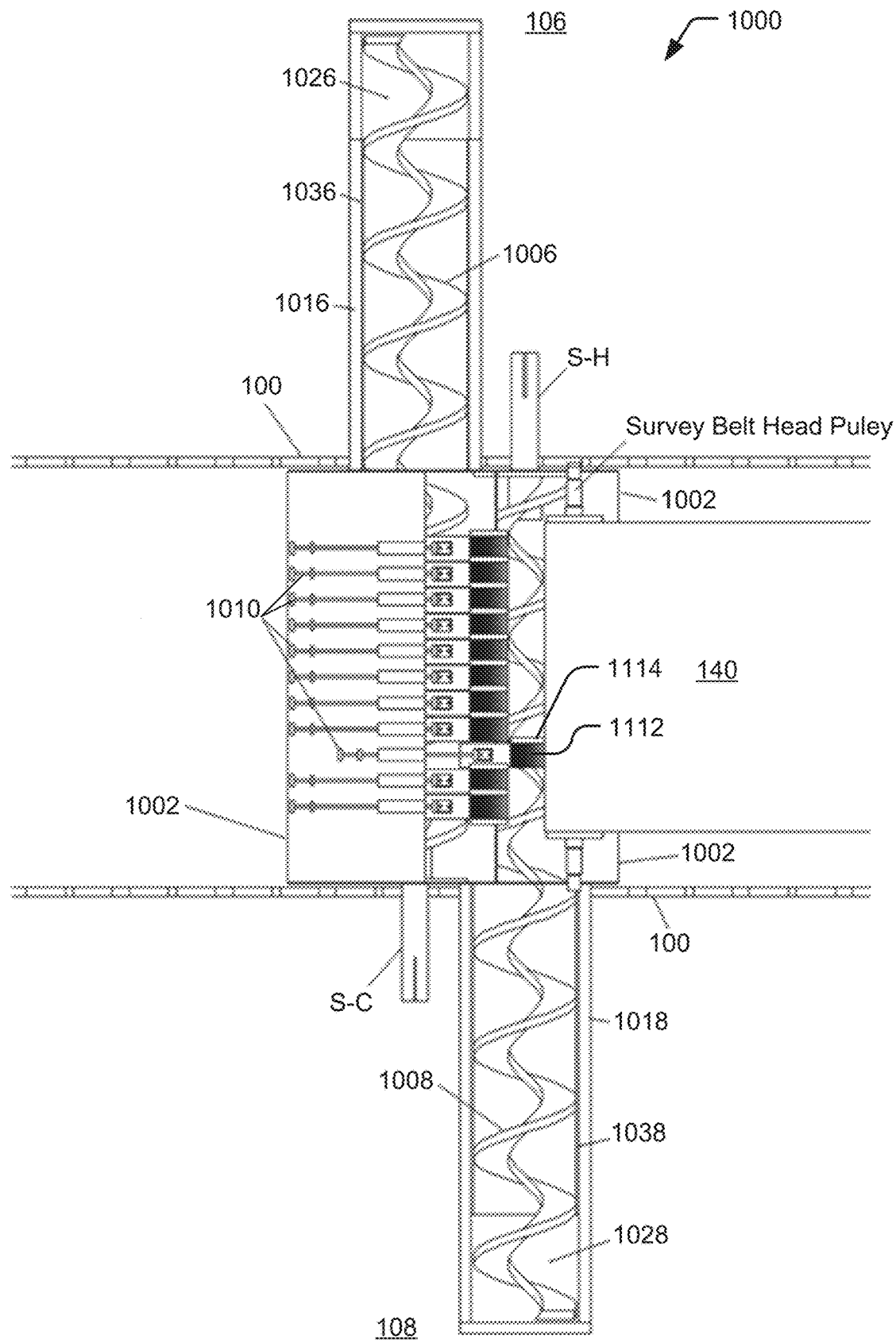

FIG. 4 illustrates a diversion assembly that may be used to implement the diversion system of FIG. 2.

Figure 5:
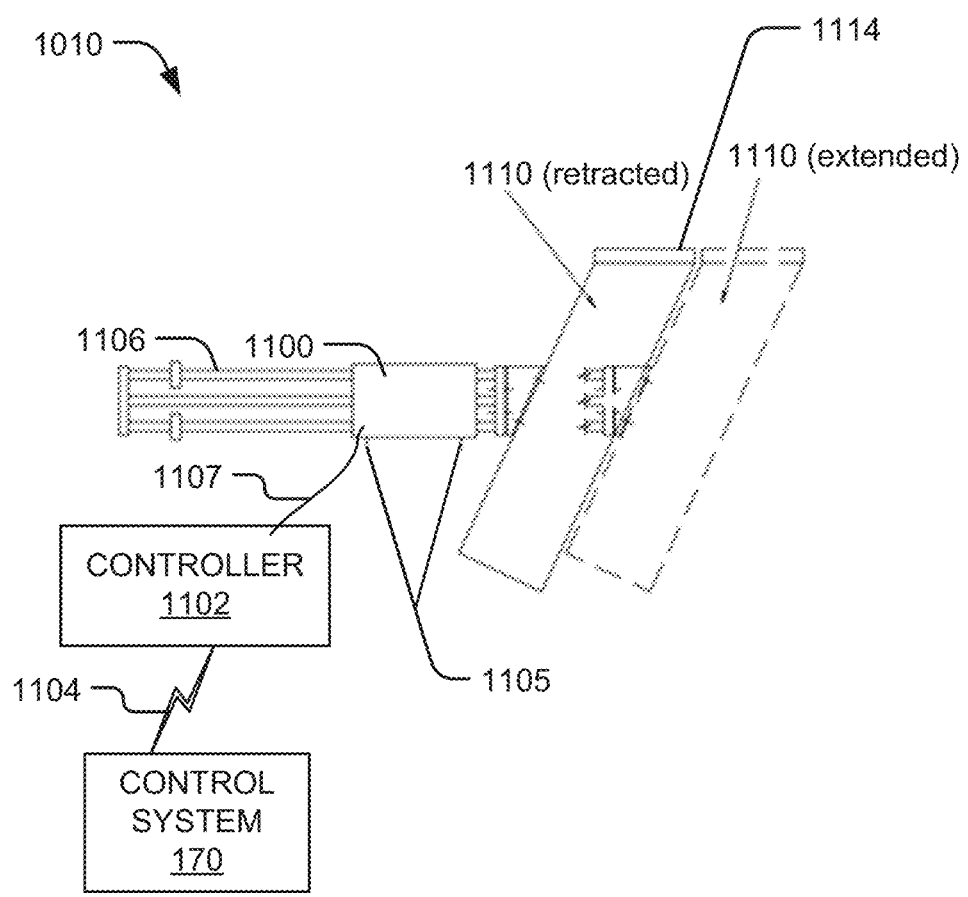

FIG. 5 is a side view of a gate assembly of the diversion assembly of FIG. 4.

Figure 6:
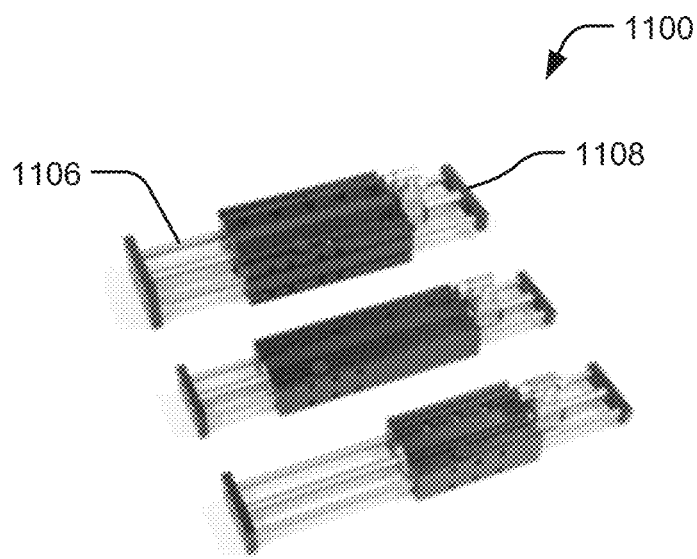

FIG. 6 is a photograph depicting three linear motors each with one or more bridge guides and one or more end plate connectors.

Figure 7:
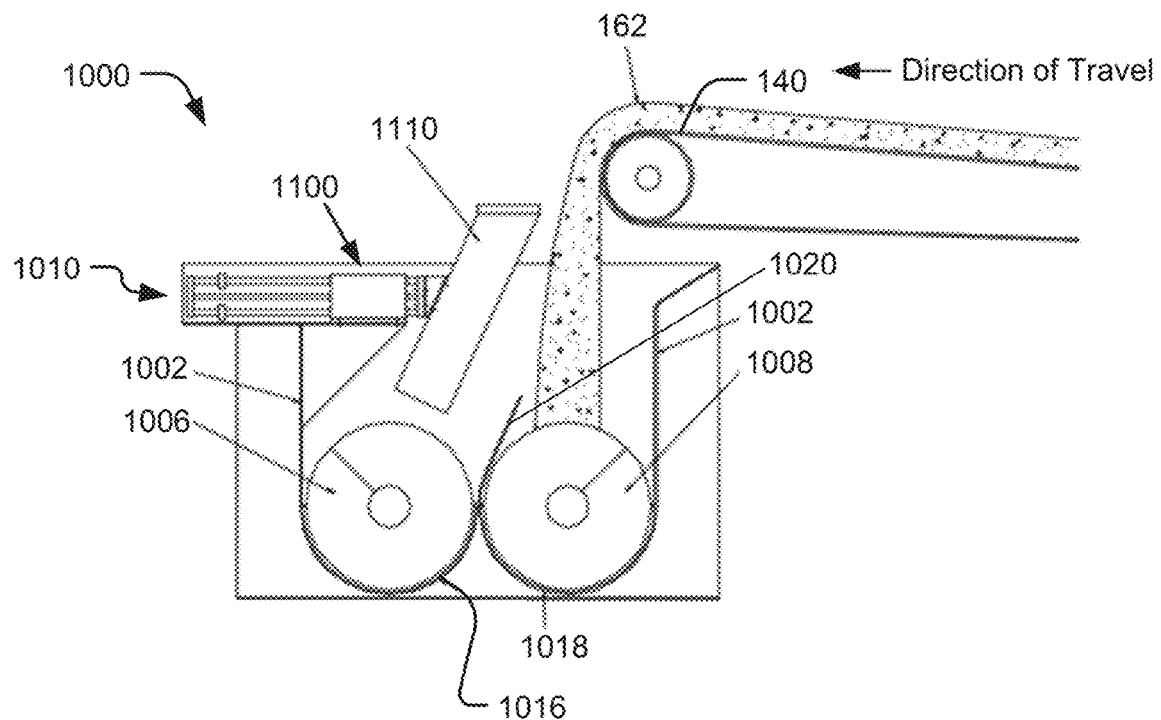

FIG. 7 is a side view of a gate chute of the gate assembly in a retracted position.

Figure 8:
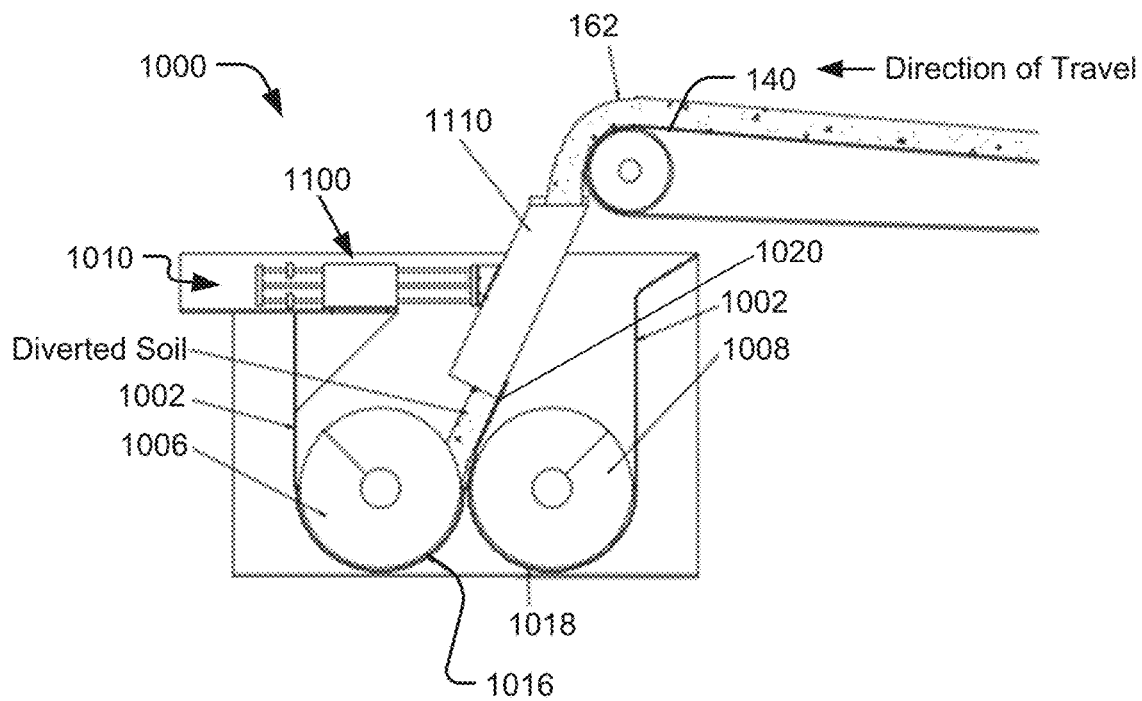

FIG. 8 is a side view of the gate chute of the gate assembly in an extended position.

Figure 9:
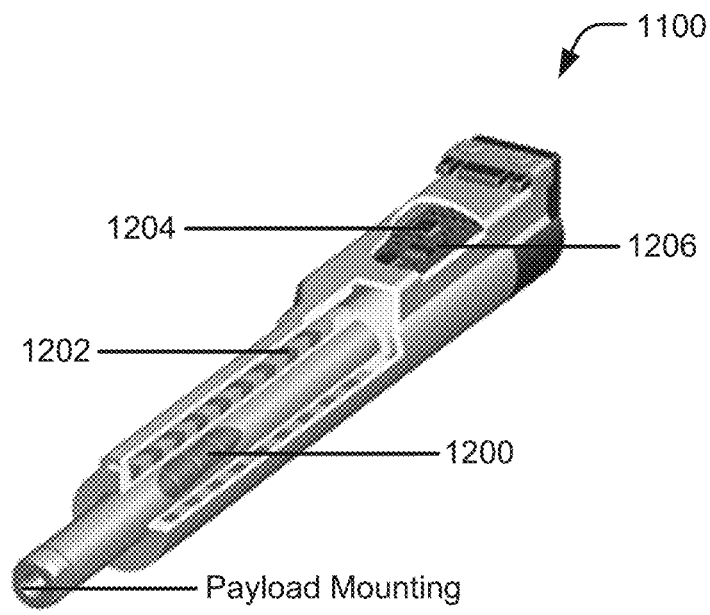

FIG. 9 is a cut-away drawing of one of the linear motors of FIG. 6.

Figure 10:
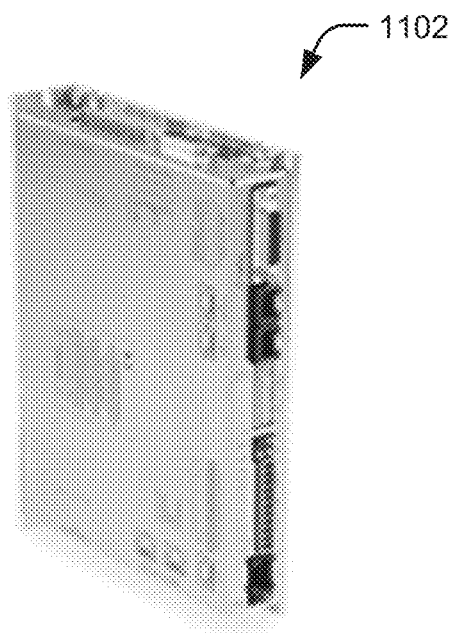

FIG. 10 is a photograph depicting an example servo drive controller that may be coupled to a corresponding linear motor configured to actuate the gate assembly of FIG. 4.

Figure 11:
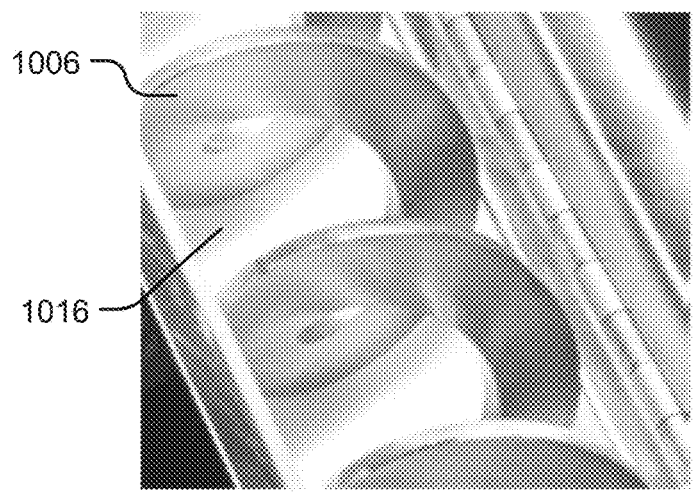

FIG. 11 is a photograph of a portion of a "hot" conveyor of the diversion assembly.

Figure 12:
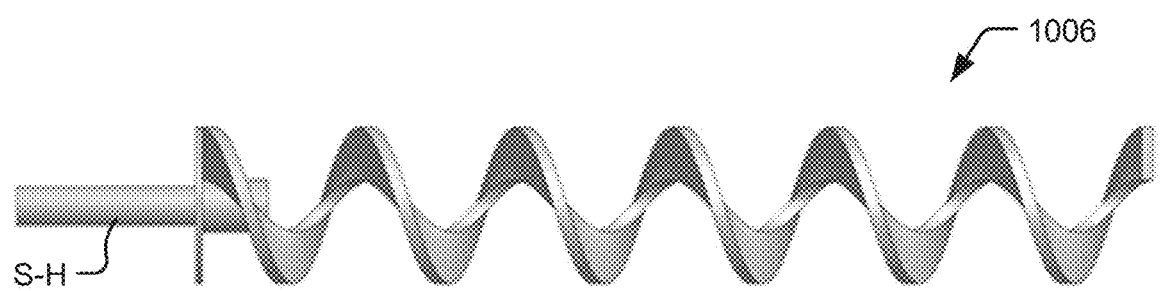

FIG. 12 is a side view of a spiral-shaped shaft of the "hot" conveyor.

Figure 13:
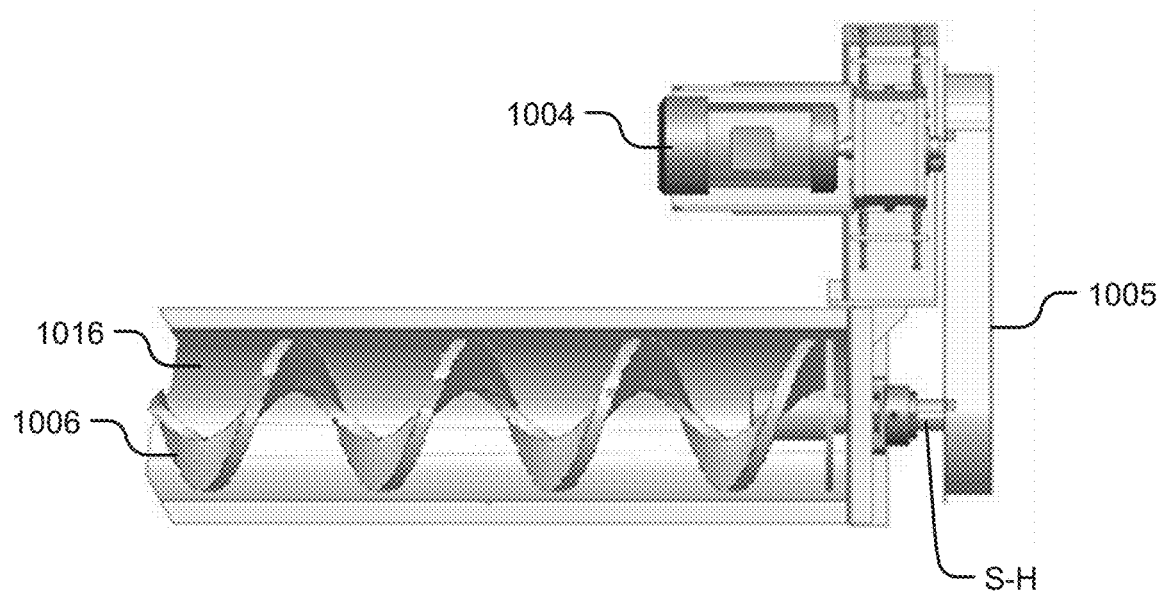

FIG. 13 is a top view of a motor coupled to and configured to rotate the spiral-shaped shaft of the "hot" conveyor.

Figure 14:
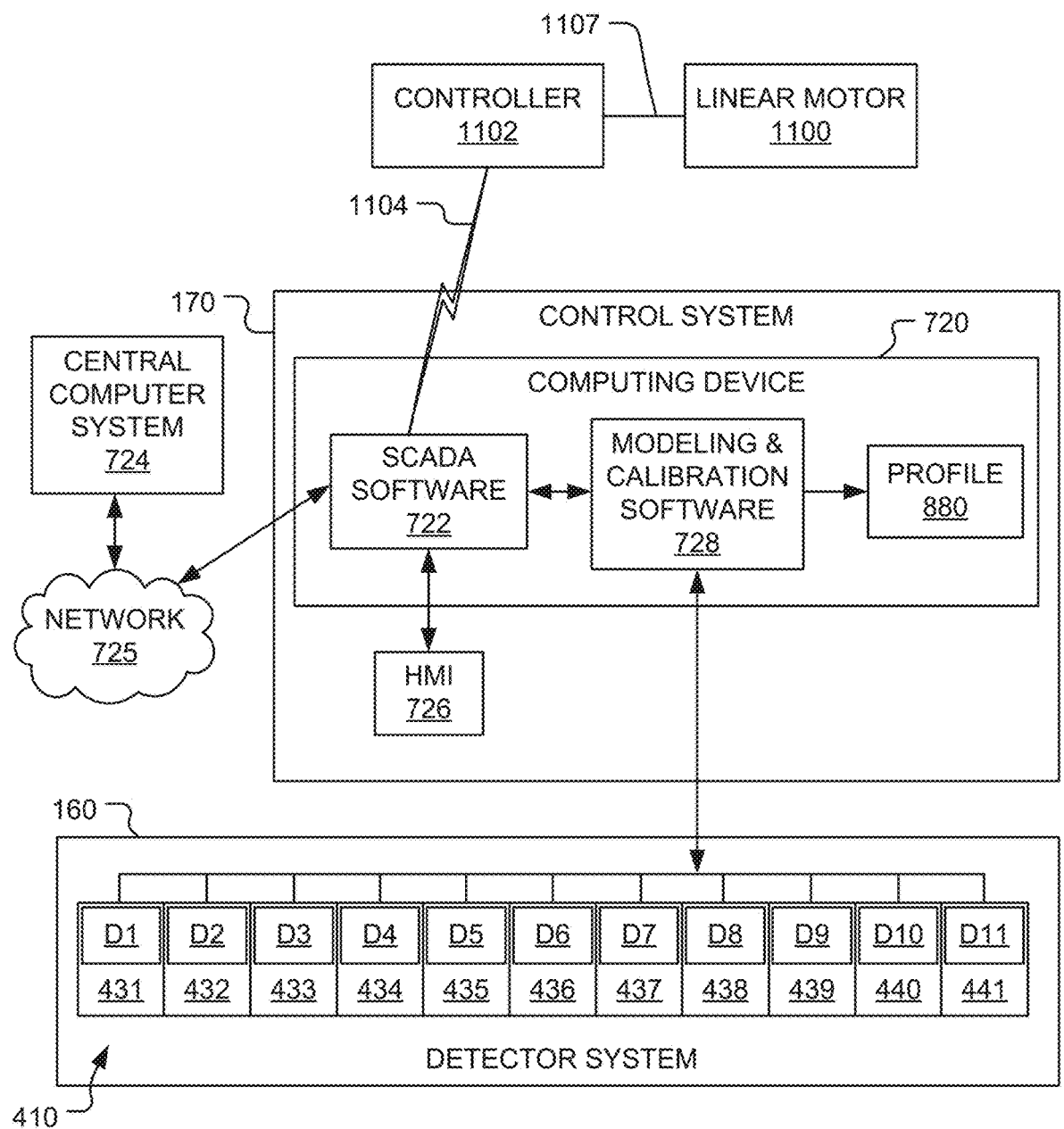

FIG. 14 is a block diagram of a control system subcomponent of the system of FIG. 5.

Figure 15:
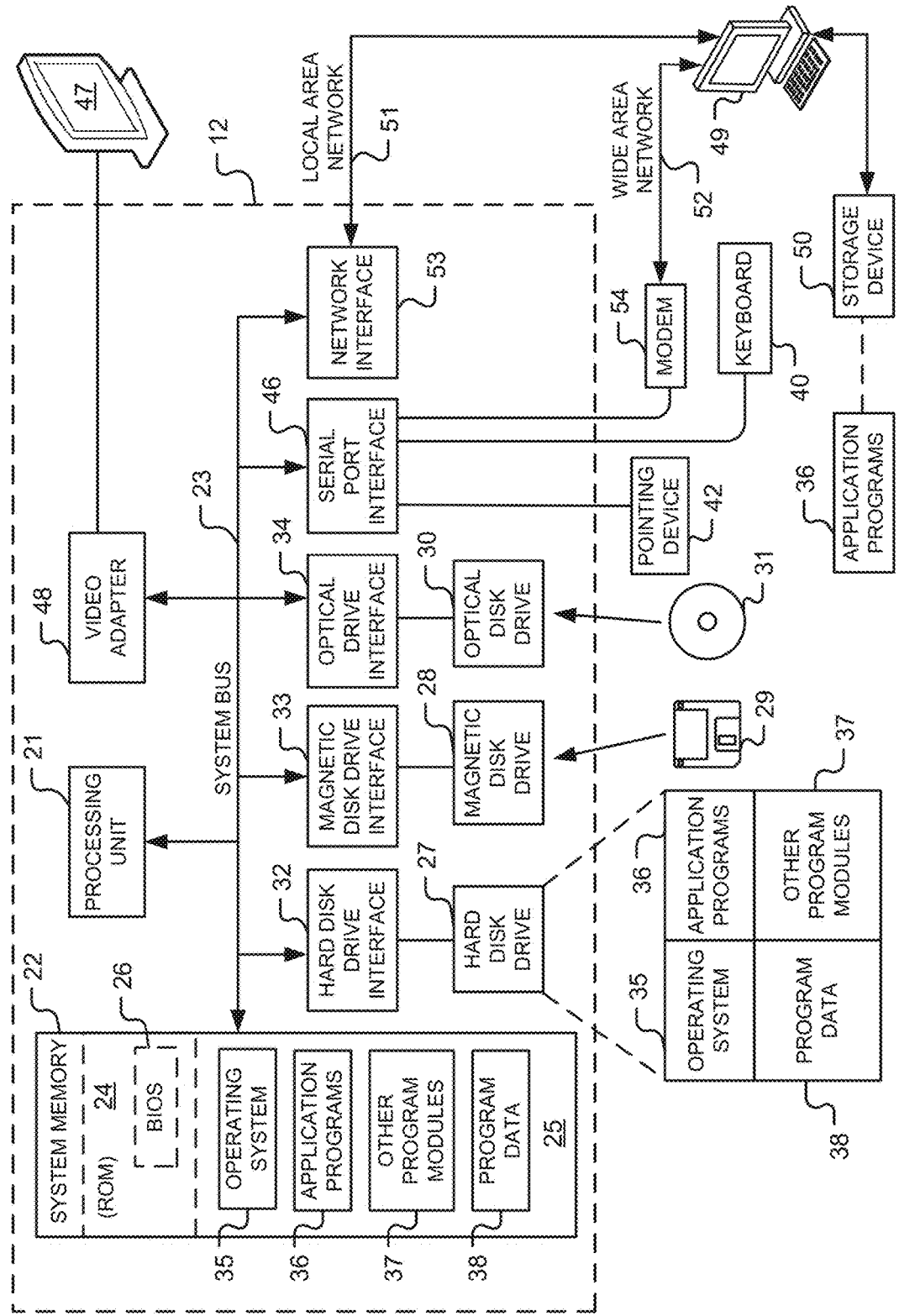

FIG. 15 is a diagram of a hardware environment and an operating environment in which the computing devices of the system of FIG. 5 may be implemented.

Like reference numerals have been used in the figures to identify like components.

DETAILED DESCRIPTION OF THE INVENTION

FIG. 2 is a reproduction of FIG. 1 from U.S. Pat. No. 9,457,382 which is incorporated herein by reference in its entirety. FIG. 2 is a block diagram of a system 100 for surveying and sorting feed material (e.g., feed soil 102) to separate contaminated portions from uncontaminated portions. For ease of illustration, the feed material will be described and illustrated as being the feed soil 102. However, the feed material may include materials such as soil, concrete rubble, masonry rubble, ores, ashes, metallic shapes, metallic scraps, vegetable matter, other types of debris, combinations and subcombinations of the aforementioned materials, and the like. Further, the feed material may be either homogenous or heterogeneous.

The system 100 may be configured to separate soil contaminated with one or more radioactive isotopes from clean or uncontaminated soil by monitoring radioactive energies, if any, emitted by the feed soil 102. In alternate embodiments, the system 100 may be configured detect other types of soil contamination, such as contamination with elemental species, volatile organic compounds, and other type of materials. The system 100 may be operated by one or more operators 104.

The feed soil 102 enters the system 100 at a first (upstream) end portion 110 and travels toward a second (downstream) end portion 112. At the second (downstream) end portion 112, contaminated portions 102-H of the feed soil 102 exit the system 100 along a "hot" side 106 of the system 100, and clean or uncontaminated portions 102-C of the feed soil 102 exit the system 100 along a "clean" side 108 of the system 100.

The feed soil 102 is supplied to the system 100 by a feed soil transport 120, such as a conventional conveyor, earth hauling equipment, and the like. For example, the feed soil 102 may be excavated with heavy equipment, such as a front end loader, and transported to the feed soil transport 120 (e.g., a feeder conveyor or screen plant), which feeds the system 100. The feed soil transport 120 deposits the feed soil 102 into a surge bin 130 that places the feed soil 102 on a soil transport mechanism 140 (e.g., a conveyor belt) as an initial soil stream 132. A second screed 150 may be used to control the thickness and width of the initial soil stream 132. The second screed 150 shapes the initial soil stream 132 into a pre-evaluation soil stream 152. The pre-evaluation soil stream 152 may be a thin layer having a depth and a density matched to the photon emission and attenuation characteristics of the contaminant of concern in the feed soil 102. The soil transport mechanism 140 transports the pre-evaluation soil stream 152 past or below a detector system 160 configured to collect data about the pre-evaluation soil stream 152.

While on the soil transport mechanism 140, the pre-evaluation soil stream 152 travels at a preselected speed underneath the detector system 160. The detector system 160 transmits information 164 about the pre-evaluation soil stream 152 to a control system 170, which may optionally be at least partially housed inside a control room 172. After the detector system 160 has gathered data about the pre-evaluation soil stream 152, the pre-evaluation soil stream 152 becomes an evaluated soil stream 162.

FIG. 3 is reproduction of FIG. 4A from U.S. Pat. No. 9,457,382, which depicts an enlarged view of a detector array 410. The detector system 160 includes the detector array 410, which is linked to the control system 170 (see FIGS. 2, 5, and 14). The detector array 410 includes a plurality of detector subassemblies 431-441, that each may include a radiation detector. For example, as shown in FIG. 14, the detector subassemblies 431-441 may include radiation detectors D1-D11, respectively. The control system 170 receives a separate and different signal from each of the detector subassemblies 431-441, and each of those signals encodes a series of pulse count values.

Referring to FIG. 2, the soil transport mechanism 140 transports the evaluated soil stream 162 to a diversion system 180. The control system 170 sends instructions 166 to the diversion system 180. The instructions 166 direct the diversion system 180 to deposit the contaminated portions 102-H of the evaluated soil stream 162 along the "hot" side 106 of the system 100, and instructs the diversion system 180 to deposit the uncontaminated portions 102-C of the evaluated soil stream 162 along the "clean" side 108 of the system 100. Thus, the diversion system 180 may subsequently discharge the contaminated portions 102-H to a storage or shipping container, or onto a stacking conveyor to create a stockpile for further processing or final disposition. The uncontaminated portions 102-C (or below criteria soil portions) are normally transported onto a different stacking conveyor.

As mentioned above, the diversion system 180 physically separates contaminated soil and clean soil. U.S. Pat. No. 9,457,382 describes the diversion system 180 as being a reversible diversion conveyor or electrically operated diversion chutes. The reversible diversion conveyor described in U.S. Pat. No. 9,457,382 may be useful for plastic soil conditions, such as sticky clays, and may be used to process hard-to-divert materials, such as slurries, sticky soil, sticks, rocks, and frozen materials.

Diversion Assembly

FIG. 4 illustrates a diversion assembly 1000 that may be used to implement the diversion system 180 (see FIG. 2). In other words, the diversion assembly 1000 may be used in place of the reversible diversion conveyor described in U.S. Pat. No. 9,457,382. The diversion assembly 1000 may be used to process granular, free-flowing soils, like sands, silts, gravels, and crushed concrete and asphalt. The system 100 (see FIG. 2) may be configured to be used selectively with the reversible diversion conveyor described in U.S. Pat. No. 9,457,382 and the diversion assembly 1000. For example, when desired, the reversible diversion conveyor may be removed from the system 100 (see FIG. 2) and the diversion assembly 1000 installed in place of the reversible diversion conveyor. The reversible diversion conveyor may be removed by unplugging its power and control wiring from the remainder of the system 100 (see FIG. 2) and physically removing the reversible diversion conveyor. The diversion assembly 1000 may be completely self-contained, so that it can be placed in the location previously occupied by the reversible diversion conveyor. Then, the power and control wiring that was unplugged from the reversible diversion conveyor can be plugged into the diversion assembly 1000.

Referring to FIG. 4, the diversion assembly 1000 includes a housing or trough 1002, a "hot" conveyor 1006, a "clean" conveyor 1008, and an array of gate assemblies 1010. In the embodiment illustrated, a portion of the "hot" conveyor 1006 is adjacent to or alongside a portion of the "clean" conveyor 1008. The "hot" conveyor 1006 travels toward the "hot" side 106 and the "clean" conveyor 1008 travels toward the "clean" side 108. Thus, in the embodiment illustrated, the "hot" conveyor 1006 travels in the opposite direction as the "clean" conveyor 1008. In other words, the "hot" and "clean" conveyors 1006 and 1008 may be substantially parallel to one another and may travel in opposite directions.

In the embodiment illustrated, the "hot" and "clean" conveyors 1006 and 1008 have each been implemented as a shaftless screw conveyor. The "hot" and "clean" conveyors 1006 and 1008 include spirals or spiral-shaped shafts S-H and S-C, respectively, that are each configured to be coupled to a motor 1004 (see FIG. 13) and rotated thereby. In the embodiment illustrated, the shafts S-H and S-C each lack a central shaft that extends longitudinally along the spiral-shaped shaft. Referring to FIG. 13, the shafts S-H and S-C (see FIG. 4) may be coupled to and rotated by two different motors, each like the motor 1004. In FIG. 13, the motor 1004 is connected to the shaft S-H by a gearbox drive assembly 1005 that rotates the shaft S-H. Referring to FIG. 4, the shaft S-C may be coupled by a similar gearbox drive assembly to a motor (like the motor 1004 illustrated in FIG. 13) that rotates the shaft S-C.

Shaftless screw conveyors are suitable for transporting hard-to-transport materials ranging from irregularly shaped dry solids, such as scrap wood and metals, to semiliquid and sticky materials, including mud, clays, rock, gravel, and process wastes, such as coal slurries. Additionally, shaftless screw conveyors enable higher trough loading while lowering revolutions per minute ("RPM") requirements. Shaftless screw conveyors eliminate material jamming and shaft buildup typical in shafted-screw conveyors. Lastly, shaftless screw conveyors do not require hanger bearings and end bearings that can cause buildup of contaminated material.

The "hot" and "clean" conveyors 1006 and 1008 may be substantially identical to one another. The "hot" conveyor 1006 is positioned inside a "hot" portion 1016 of the trough 1002 and rotates along its longitudinal axis inside the "hot" portion 1016. The "hot" portion 1016 extends from the gate assemblies 1010 to the "hot" side 106. The "hot" portion 1016 is closed along its bottom side and configured to guide the contaminated portions 102-H (see FIG. 2) of the feed soil 102 (see FIG. 2) toward the "hot" side 106. The "hot" portion 1016 has a discharge opening 1026 at the "hot" side 106 through which the contaminated portions 102-H (see FIG. 2) exit the trough 1002. The "hot" portion 1016 may be lined with a liner 1036 (e.g., constructed from plastic, such as Ultra High Molecular Weight Polyethylene ("UHMWPE")). The "hot" portion 1016 may be covered to prevent items from falling into the "hot" portion 1016.

Similarly, the "clean" conveyor 1008 is positioned inside a "clean" portion 1018 of the trough 1002 and rotates along its longitudinal axis inside the "clean" portion 1018. The "clean" portion 1018 extends from the gate assemblies 1010 to the "clean" side 108. At the gate assemblies 1010, a portion of the "clean" portion 1018 extends alongside a portion of the "hot" portion 1016. The "clean" portion 1018 is closed along its bottom side and configured to guide the uncontaminated portions 102-C (see FIG. 2) of the feed soil 102 (see FIG. 2) toward the "clean" side 108. The "clean" portion 1018 has a discharge opening 1028 at the "clean" side 108 through which the uncontaminated portions 102-C (see FIG. 2) exit the trough 1002. The "clean" portion 1018 may be lined with a liner 1038 (e.g., constructed from plastic, such as UHMWPE). The "clean" portion 1018 may be covered to prevent items from falling into the "clean" portion 1018. The "clean" portion 1018 and the "hot" portion 1016 are isolated from one another in a manner that prevents the uncontaminated portions 102-C from flowing into the "hot" portion 1016, and prevents the contaminated portions 102-H from flowing into the "clean" portion 1018. For example, as shown in FIGS. 7 and 8, the trough 1002 may include a divider 1020 that separates the "hot" portion 1016 from the "clean" portion 1018.

As shown in FIG. 4, the gate assemblies 1010 are arranged side-by-side within the array. Each of the gate assemblies 1010 has a gate chute 1110 (see FIGS. 5, 7, and 8) and determines which of the "hot" and "clean" conveyors 1006 and 1008 receive any of the evaluated soil stream 162 (see FIGS. 2, 7, and 8) traveling through the gate chute 1110. The instructions 166 (see FIG. 2) may instruct each of the gate assemblies 1010 to position its gate chute 1110 such that one of the "hot" and "clean" conveyors 1006 and 1008 receive a portion of the evaluated soil stream 162. Thus, each of the gate assemblies 1010 may be characterized as being a computer-controlled diversion chute. Each of the gate assemblies 1010 is aligned with a corresponding one of the radiation detectors D1-D11 (see FIG. 14) of a corresponding one of the detector subassemblies 431-441 (see FIGS. 3 and 14). When "hot" material is discovered by one or more of the detector subassemblies 431-441 (see FIGS. 3 and 14), any of the gate assemblies 1010 that are directly downstream of the detector subassembly or subassemblies that detected the "hot" material is/are used to divert the "hot" material to the "hot" side 106 of the system 100. At the same time, any "clean" material being carried by the soil transport mechanism 140 travels to the "clean" side 108 of the system 100. In other words, the control system 170 receives the information 164 from the detector subassemblies 431-441, determines which, if any, of the detector subassemblies 431-441 detected "hot" material, and sends at least one of the instructions 166 (see FIG. 2) to each of the gate assemblies 1010. Each of the gate assemblies 1010 that is downstream from one of the detector subassemblies 431-441 that detected "hot" material is instructed (by the instructions 166) to position its gate chute 1110 so that a corresponding portion of the evaluated soil stream 162 flows through the gate chute 1110 and into the "hot" conveyor 1006. On the other hand, each of the gate assemblies 1010 that is downstream from one of the detector subassemblies 431-441 that did not detect "hot" material is instructed (by the instructions 166) to position its gate chute 1110 so that a corresponding portion of the evaluated soil stream 162 flows passed the gate chute 1110 and into the "clean" conveyor 1008.

FIG. 5 is a side view of one of the gate assemblies 1010. Referring to FIG. 5, each of the gate assemblies 1010 may be actuated by a corresponding linear motor 1100 coupled to a corresponding servo drive controller 1102. Thus, the diversion assembly 1000 (see FIGS. 4, 7, and 8) may include a plurality of linear motors 1100 and a plurality of servo drive controllers 1102. Each of the servo drive controllers 1102 is connected to the control system 170 by via a wired or wireless communication link 1104. The diversion assembly 1000 includes control electronics (e.g., the servo drive controller 1102) for each of the linear motors 1100. The linear motors 1100 may be implemented as electromagnetic direct drives in tubular form. The linear motion may be produced purely electrically and wear-free, without any intermediate coupling of mechanical gearboxes, spindles, or belts.

As mentioned above, each of the gate assemblies 1010 includes the gate chute 1110, which is illustrated in FIG. 5 in both retracted and extended positions. Referring to FIG. 4, the gate chute 1110 defines a through-channel 1112 configured to allow a portion of the evaluated soil stream 162 (see FIGS. 2, 7 and 8) to travel therethrough. The gate chutes 1110 may each have one or more fins 1114 positioned along their open top portions configured to help guide the evaluated soil stream 162 into the through-channel 1112. As mentioned above, each of the gate assemblies 1010 is aligned with one of the radiation detectors D1-D11 (see FIG. 14) of a corresponding one of the detector subassemblies 431-441 (see FIGS. 3 and 14). Therefore, the through-channel 1112 may have a width corresponding to a width of a sensing window of the radiation detector that corresponds to the gate assembly. The gate chute 1110 may be implemented as a metal chute configured to direct a portion of the evaluated soil stream 162 having a width determined at least in part by the through-channel 1112.

Referring to FIG. 5, the servo drive controller 1102 is configured to receive instructions from the control system 170 (via the communication link 1104) and actuate the linear motor 1100 causing the linear motor 1100 to generate motion in a first (e.g., forward) direction and/or in a second (e.g., backward) direction. Referring to FIGS. 7 and 8, the second direction may be along a direction of travel of the soil transport mechanism 140. The first direction may be opposite the second direction. When the linear motor 1100 generates motion in the second direction, the gate chute 1110 moves toward the retracted position (see FIG. 7). On the other hand, when the linear motor 1100 generates motion in the first direction, the gate chute 1110 moves toward the extended position (see FIG. 8).

Referring to FIG. 5, the linear motors 1100 are mounted (e.g., to the trough 1002 illustrated in FIGS. 4, 7, and 8) in stationary positions by one or more mountings 1105. FIG. 6 is a photograph depicting three of the linear motors 1100 each with one or more bridge guides 1106 and one or more end plate connectors 1108. Referring to FIG. 6, the linear motors 1100 are each configured to selectively move the bridge guide(s) 1106 forward or backward along a linear travel path. One of the gate chutes 1110 (see FIGS. 4, 5, 7, and 8) is attached to the bridge guide(s) 1106 of one of the linear motors 1100 and moves with the bridge guide(s) 1106 as a unit. In the embodiment illustrated, one of the gate chutes 1110 (see FIGS. 5, 7, and 8) is mounted to the end plate connector(s) 1108 of one of the linear motors 1100. The bridge guide(s) 1106 may be implemented as compact guide units having high overhung load limits, like those that will be encountered by the gate assemblies 1010. The end plate connectors 1108 increase the mechanical stiffness of the bridge guide(s) 1106 and provide a place to mount the gate chutes 1110. The bridge guide(s) 1106 of each of the linear motors 1100 are used as load bearings, to resist external forces and rotational and bending moments, and as an anti-rotation device. The bridge guide(s) 1106 of each of the linear motors 1100 provide high-precision guidance and allow dynamic and precise positioning of the gate chute 1110, which may be mounted directly to the end plate connector 1108 of the bridge guide(s) 1106.

Referring to FIG. 2, as explained above, the soil transport mechanism 140 transports the evaluated soil stream 162 to the diversion system 180. Thus, in the embodiment illustrated in FIGS. 7 and 8, the soil transport mechanism 140 transports the evaluated soil stream 162 to the diversion assembly 1000. In the embodiment illustrated, the soil transport mechanism 140 is illustrated as a conveyor (or survey belt) and the evaluated soil stream 162 travels off the end of the conveyor. Each of the gate assemblies 1010 is configured to extend and retract its gate chute 1110 independently and in response to commands or instructions (e.g., the instructions 166 depicted in FIG. 2) received from the control system 170 (see FIGS. 2, 5, and 14).

Referring to FIG. 7, when the linear motor 1100 generates motion in the second direction, the gate chute 1110 moves toward the retracted position (see FIG. 7). When the gate chute 1110 is in retracted position, the gate chute 1110 is spaced apart from the evaluated soil stream 162 and allows the evaluated soil stream 162 to flow into the "clean" portion 1018 of the trough 1002. In other words, when the gate chutes 1110 are retracted, the evaluated soil stream 162 falls unimpeded into the "clean" conveyor 1008 which is traveling toward the "clean" side 108 (see FIGS. 2 and 4).

On the other hand, referring to FIG. 8, when the linear motor 1100 generates motion in the first direction, the gate chute 1110 moves toward the extended position (see FIG. 8). Referring to FIG. 8, when the gate chute 1110 is in extended position, the gate chute 1110 is positioned in the evaluated soil stream 162 and the through-channel 1112 (see FIG. 4) receives a portion of the evaluated soil stream 162. The portion of the evaluated soil stream 162 received by the gate chute 1110 travels through the through-channel 1112 and is deposited into the "hot" conveyor 1006. Thus, each of the gate assemblies 1010 is configured to divert a portion of the evaluated soil stream 162 to the "hot" side 106 (see FIGS. 2 and 4) by inserting the gate chute 1110 into the evaluated soil stream 162 as the evaluated soil stream 162 falls off the soil transport mechanism 140 (e.g., conveyor). When so inserted, the gate chute 1110 directs the soil portion onto the "hot" conveyor 1006 positioned underneath the gate chute 1110 and traveling toward the "hot" side 106 (see FIGS. 2 and 4).

As shown in FIG. 4, at least one of the gate chutes 1110 may be extended (see FIG. 8) while, at the same time, at least one of the gate chutes 1110 may be retracted (see FIG. 7). Thus, one of the gate assemblies 1010 can deploy and divert a relatively small amount of the evaluated soil stream 162 to the "hot" conveyor 1006, particularly when the evaluated soil stream 162 contains only enough radioactivity for a single gate diversion. Multiple-gate diversions are normal, but single gate diversions can happen frequently. The gate assemblies 1010 make it possible to divert soil from anywhere on the soil transport mechanism 140 (e.g., a conveyor belt) with very little collateral soil also being unnecessarily diverted as well, which is something a reversible belt cannot do. When multiple ones of the gate chutes 1110 are extended, the fins 1114 at the top of each of the extended gate chutes 1110 are positioned in between the extended gate chutes 1110 and direct the evaluated soil stream 162 into the extended gate chutes 1110 so that all of the evaluated soil stream 162 falls into the extended gate chutes 1110 and not into the space between them.

The gate chutes 1110 may be configured to avoid clogging by the use of dynamic motions, referred to as "motion profiles," which include fine rapid movements made by the linear motors 1100. The various motion profiles are designed to keep the evaluated soil stream 162 moving freely through the through-channels 1112 of the gate chutes 1110. The motion profiles may generate horizontal motion with travel speeds of up to about seven meters per second and with accelerations of over 700 meters per second squared (m/s$^2$). The linear motor 1100 may have an expected operating life of up to two billion cycles and may be configured to run underwater.

Linear Motors

FIG. 9 is a cut-away drawing of one of the linear motors 1100. By way of a non-limiting example, each of the linear motors 1100 may include just two parts: a slider 1200 and a stator 1202. The slider 1200 may be constructed of neodymium magnets mounted in a high-precision stainless steel tube. The stator 1202 may include motor windings, bearings for the slider 1200, one or more sensors 1204, and a microprocessor circuit 1206 for monitoring the linear motor 1100. The sensor(s) 1204 include one or more position capture sensors and may also include one or more temperature sensors. Because the linear motors 1100 do not include any wearing components, extremely dynamic motions can be achieved with a long operational life.

The linear motors 1100 may be positioned freely along their entire stroke. Travel speed and acceleration can also be precisely defined. For more complex motions, referring to FIG. 5, any number of motion profiles can be stored in the servo drive controller 1102 (e.g., as time curves), and the linear motors 1100 can execute the motion profiles at the desired speed. The internal position capture sensor measures and monitors the current position of the linear motor 1100, both at rest and in motion. Deviations in position are detected immediately and reported to the control system 170 (see FIGS. 2, 5, and 14). This helps guarantee a high level of operational security and reliable error detection.

As mentioned above, the many electrical and pneumatic control components of the prior art SGS provided by Eberline were prone to failure, and required constant adjustment and recalibration for the gates to actuate at the correct times to accomplish diversion successfully. Referring to FIGS. 7 and 8, the diversion assembly 1000 avoids these problems because the diversion assembly 1000 includes the linear motors 1100 instead of pneumatic cylinders. The advantages of the linear motors 1100 over pneumatic cylinders are many because many components can be completely eliminated. For example, an expensive, noisy, bulky, and high-maintenance compressor and all the mechanical and electrical accessories for pneumatic operation, such as magnetic position sensors, valve manifolds, fittings, and hoses can be eliminated. Also, extensive maintenance work required for pneumatic systems can be completely eliminated.

Servo Drive Controllers

FIG. 10 is a photograph depicting an example servo drive controller that may be used to implement one of the servo drive controllers 1102. Referring to FIG. 5, the servo drive controllers 1102 may be implemented as compact positioning controllers with integrated power units for dynamic and precise control of the linear motors 1100. Each of the servo drive controllers 1102 may have a memory and may be configured to store parameters associated with one or more of the linear motors 1100 in the memory. Each of the servo drive controllers 1102 may be implemented as a plug and play servo drive controller configured to read the stored parameters from the memory when the servo drive controller boots up to automatically recognize the one or more of the linear motors 1100. This automatic device recognition eliminates the need to select the required model parameters from an extensive library.

One of the linear motors 1100 can be set in motion immediately after installing its corresponding servo drive controller 1102 and connecting (e.g., via a cable 1107) the corresponding servo drive controller 1102 to the linear motor 1100. Without needing to boot up configuration software, initial commands can be sent immediately to the servo drive controller 1102 by the control system 170 (see FIGS. 2, 5, and 14).

A wide range of analog, digital, and serial interfaces as well as various fieldbus interfaces allow integration into any controls concept. The servo drive controllers 1102 may be implemented as a flexible single-axis or compact multi-axis devices. The servo drive controllers 1102 may be controlled by software (e.g., a supervisory control and data acquisition ("SCADA") software program 722 executed by the control system 170 illustrated in FIG. 14). The servo drive controllers 1102 may each include RS232 and/or RS485 interfaces configured to communicate with (e.g., receive instructions from) such software. Such software may include Visual Basic, Excel, and other Windows-based programs. As an alternative, Ethernet drives with the software may be used.

The servo drive controllers 1102 may store movement instructions, such as one or more time curves (e.g., up to 99 different time curves with up to 16,000 individual waypoints). The linear motor 1100 may be configured to execute the movement instructions. For example, the linear motor 1100 may be configured to travel along time curves of any complexity, such as those generated by Computer-aided design ("CAD") programs and stored in the servo drive controllers 1102 as an Excel CSV formatted file. The movement instructions (e.g., time curves) can be invoked via a serial interface or Ethernet input. The movement instructions define the movements of the gate assemblies 1010, and any pre-programmed motion profiles, such as high-frequency vibration, that can help keep the gate chutes 1110 clear of debris, such as mud, while extended into the evaluated soil stream 162.

Referring to FIG. 2, as the pre-evaluation soil stream 152 travels past the detector system 160, the radiation detectors D1-D11 (see FIG. 14) of the detector subassemblies 431-441 (see FIGS. 3 and 14) send the information 164 about the pre-evaluation soil stream 152 to the control system 170. Referring to FIG. 5, the control system 170 determines which of the detector subassemblies 431-441 (see FIGS. 3 and 14) has detected "hot" material and instructs any of the gate assemblies 1010 directly downstream from those detector subassemblies to move the gate chute 1110 to the extended position. As mentioned above, each of the gate assemblies 1010 may be actuated by its corresponding linear motor 1100 coupled to its corresponding servo drive controller 1102. The control system 170 sends an extend instruction to the servo drive controller 1102 via the communication link 1104 (e.g., serial interface or Ethernet input). The extend instruction identifies movement instructions (e.g., time curves) stored by the servo drive controller 1102, which the servo drive controller 1102 sends to its corresponding linear motor 1100. In response, the linear motor 1100 executes the movement instructions. Thus, the linear motor 1100 moves the gate chute 1110 to the extended position, in which the gate chute 1110 directs the "hot" material into the "hot" conveyor 1006. The "hot" conveyor 1006 deposits the "hot" material on the "hot" side 106 (see FIGS. 2 and 4).

The gate chute 1110 of each of those of the gate assemblies 1010 that are not directly downstream from those of the detector subassemblies 431-441 (see FIGS. 3 and 14) that detected the "hot" material remain in or are moved to the retracted position (see FIG. 7). In the retracted position, the gate chute 1110 allows the uncontaminated or "clean" material to enter the "clean" conveyor 1008 and be diverted thereby to the "clean" side 108 (see FIGS. 2 and 4). The gate chute 1110 is moved to the retracted position (see FIG. 7) by the control system 170, which sends a retract instruction to the servo drive controller 1102 via the communication link 1104 (e.g., serial interface or Ethernet input). The retract instruction identifies movement instructions (e.g., time curves) stored by the servo drive controller 1102, which the servo drive controller 1102 sends to its corresponding linear motor 1100. In response, the linear motor 1100 executes the movement instructions.

Power Supply Modules

The diversion assembly 1000 may include one or more power supply modules (not shown). Referring to FIG. 13, the power supply module(s) (not shown) provide power needed by the motor 1004, and ensure secure operation. By way of non-limiting examples, the power supply module(s) (not shown) may have a 1-phase power rating or 3-phase power rating. The power supply module(s) (not shown) may have a switched-mode power supply voltage for logic and motor circuitry that is 24 volts to 48 volts, 300-watt DC. Referring to FIG. 4, motor circuits (not shown) that supply power to the motors (e.g., each like the motor 1004 illustrated in FIG. 13) that rotate the "hot" conveyor 1006 and the "clean" conveyor 1008 may be supplied and controlled separately.

Control System

Referring to FIG. 2, all of the data collection systems of the system 100 may be connected (via wired or wireless connections) to the control system 170. Referring to FIG. 14, the control system 170 includes at least one computing device (e.g., a computing device 720) executing the SCADA software program 722 configured to control the soil sorting process. For example, the SCADA software program 722 may identify movement instructions (e.g., time curves) for each of the servo drive controllers 1102. Then, each of the servo drive controllers 1102 may send the identified movement instructions to its corresponding linear motor 1100, which executes the movement instructions. The SCADA software program 722 may be implemented using a program named DAQFactory, which is available from Azeotech, Inc. DAQFactory provides a stable, Windows-based interface platform, on which SCADA functionality may be programmed.

The SCADA software program 722 may gather and monitor digital information, and log that information on a central computer system 724 connected to the control system 170 (e.g., via a network 725 such as the Internet). The SCADA software program 722 may perform these functions in real time. The SCADA software program 722 may have one or more programming parameters with values that may be selected or determined by the operators 104 (see FIG. 2). The SCADA software program 722 may conduct analysis and exercise control based on the values of those programming parameters.

The SCADA software program 722 may be configured to display information in a logical and organized fashion via a human/machine interface ("HMI") 726 (e.g., a monitor or other type of display device). The HMI 726 may be configured to display trend graphs, waterfall graphs, tabular data, and the like.

The computing device 720 executes the one or more modeling and calibration software programs 728 that model detector array geometry, determine energy and efficiency calibration values for the detector system 160 (see FIGS. 2, 3, and 14), and provide data to the SCADA software program 722 that the SCADA software program 722 uses to control components of the system 100 (e.g., the diversion system 180 and/or the diversion assembly 1000). For example, the SCADA software program 722 may identify movement instructions (e.g., time curves) for each of one or more of the servo drive controllers 1102 that cause the corresponding linear motor 1100 to move its gate chute 1110 to the extended position (see FIG. 8) when the modeling and calibration software programs 728 indicate that an amount of radiation detected by a corresponding one of the radiation detectors D1-D11 (see FIG. 14) exceeds a predetermined amount. Similarly, the SCADA software program 722 may identify movement instructions (e.g., time curves) for each of one or more of the servo drive controllers 1102 that cause the corresponding linear motor 1100 to move its gate chute 1110 to the retracted position (see FIG. 8) when the modeling and calibration software programs 728 indicate that the amount of radiation detected by a corresponding one of the radiation detectors D1-D11 (see FIG. 14) does not exceed the predetermined amount. By way of a non-limiting example, the modeling and calibration software programs 728 may include a Genie 2000 Gamma Acquisition and Analysis software package, available from Canberra Industries Inc. This software package includes In-Situ Object Counting System ("ISOCS") software, and Genie-2000 Geometry Composer software.

As mentioned above, the detector array 410 includes the detector subassemblies 431-441, which include the radiation detectors D1-D11, respectively. By way of a non-limiting example, each of the radiation detectors D1-D11 may be implemented as a sodium iodide (NaI) radiation detector configured to determine an amount of radioactivity present. Such sodium iodide (NaI) radiation detectors are described in U.S. Pat. No. 9,457,382.

The modeling and calibration software programs 728 (e.g., the Genie 2000 Gamma Acquisition and Analysis software package) may include or access a characterization profile 880 for the radiation detectors D1-D11 (e.g., a Canberra ISOCS/LabSOCS Characterization Profile for 3×3 NaI detectors). The characterization profile 880 may be used to identify and account for the properties inherent in the spectroscopy of the radiation detectors D1-D11 when compared with other types of detectors (e.g., germanium detectors).

Each of the computing devices (e.g., the computing device 720 and the central computer system 724) depicted in FIG. 14 may be implemented by a computing device 12 descripted below and illustrated in FIG. 15.

Computing Device

FIG. 15 is a diagram of hardware and an operating environment in conjunction with which implementations of the one or more computing devices of the system 100 may be practiced. The description of FIG. 15 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 15 includes a general-purpose computing device in the form of the computing device 12. Each of the computing devices of FIG. 15 (including the computing device 720 and the central computer system 724) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface. Further, the HMI 726 (see FIG. 14) may include any of the components of the user interface, as well as the monitor 47 or other type of display device.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 15 include a local-area network (LAN) 51 and a wide-area network (WAN) 52. Such networking environments are commonplace in offices, enterprise-wide computer networks, intranets and the Internet. The network 725 (see FIG. 14) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A diversion assembly for use with a feed material, the diversion assembly comprising:
 a plurality of movable gate chutes each positionable in a retracted position and an extended position;
 a plurality of linear motors each configured to selectively position a corresponding one of the plurality of movable gate chutes in the retracted position or the extended position;
 a first conveyor configured to carry, for each of any of the plurality of movable gate chutes in the retracted position, a first portion of the feed material to a first area; and
 a second conveyor configured to carry, for each of any of the plurality of movable gate chutes in the extended position, a second portion of the feed material to a second area, the second area being spaced apart from the first area.

2. The diversion assembly of claim 1 for use with a control system and a plurality of radiation detectors, the plurality of radiation detectors each being configured to detect contamination in a portion of the feed material, the control system being configured to receive a detection signal from each of the plurality of radiation detectors and formulate one or more instructions based thereupon, wherein the plurality of movable gate chutes are each aligned with a different corresponding one of the plurality of radiation detectors, and the diversion assembly further comprises:
 a plurality of drive controllers each connected to a corresponding one of the plurality of linear motors, each of the plurality of drive controllers receiving at least one of the one or more instructions, the at least one instruction identifying one or more movement instructions, each of the plurality of drive controllers sending the one or more movement instructions identified by the at least one instruction received by the drive controller to the corresponding linear motor connected to the drive controller, the corresponding linear motor executing the one or more movement instructions.

3. The diversion assembly of claim 2, wherein the one or more movement instructions comprise one or more time curves.

4. The diversion assembly of claim 3, wherein the one or more time curves define high-frequency vibration that helps keep one or more of the plurality of movable gate chutes clear of debris.

5. The diversion assembly of claim 1, wherein the first and second conveyors are each a shaftless screw conveyor.

6. The diversion assembly of claim 1, wherein the first and second conveyors travel in opposite directions with respect to one another.

7. The diversion assembly of claim 1, wherein the first portion is an uncontaminated portion of the feed material, and
 the second portion is a contaminated portion of the feed material.

8. The diversion assembly of claim 1, wherein the plurality of linear motors comprise electromagnetic direct drives in tubular form.

9. The diversion assembly of claim 1, wherein each of the plurality of linear motors comprises one or more bridge guides that move forward and backward along a linear travel path and carry the corresponding movable gate chute therewith.

10. The diversion assembly of claim 1, wherein each of the plurality of movable gate chutes (a) defines a through-channel, and (b) has an open top portion and at least one fin positioned along the open top portion, the at least one fin being configured to help guide a corresponding portion of the feed material into the through-channel defined by the movable gate chute.

11. A diversion assembly for use with a feed material transported by a soil transport mechanism, the diversion assembly comprising:
 a first screw conveyor;
 a second screw conveyor; and a diversion assembly comprising a plurality of movable gate chutes arranged side-by-side within an array, the plurality of movable gate chutes each being positionable in a first position and a second position, any of the plurality of movable gate chutes positioned in the first position diverting a diverted portion of the feed material from the soil transport mechanism into the first screw conveyor, any of the plurality of movable gate chutes positioned in the second position not contacting the feed material and allowing a remaining portion, if any, of the feed material to flow unimpeded from the soil transport mechanism into the second screw conveyor.

12. The diversion assembly of claim 11, wherein the first and second screw conveyors are each a shaftless screw conveyor.

13. The diversion assembly of claim 11, further comprising:
a trough housing at least a portion of the first screw conveyor and at least a portion of the second screw conveyor, the first screw conveyor traveling in a first direction of travel, the second screw conveyor traveling in a second direction of travel, the first direction of travel being different from the second direction of travel.

14. The diversion assembly of claim 13, wherein the trough has a first discharge opening through which the diverted portion of the feed material exits the first screw conveyor, and
the trough has a second discharge opening through which the remaining portion of the feed material exits the second screw conveyor.

15. The diversion assembly of claim 13 for use with the soil transport mechanism being a conveyor belt traveling a third direction of travel, wherein the plurality of movable gate chutes are positioned above the trough and are configured to be positioned below an upper surface of the conveyor belt,
the first position is an extended position,
the second position is a retracted position,
the plurality of movable gate chutes are configured to move along the third direction of travel when moving from the extended position to the retracted position, and
the plurality of movable gate chutes are configured to move along a fourth direction of travel when moving from the retracted position to the extended position, the fourth direction of travel being opposite the third direction of travel.

16. The diversion assembly of claim 11, further comprising:
a plurality of linear motors each configured to selectively position a corresponding one of the plurality of movable gate chutes in the first position or the second position.

17. The diversion assembly of claim 16, wherein the plurality of linear motors comprise electromagnetic direct drives in tubular form.

18. The diversion assembly of claim 16, wherein each of the plurality of linear motors comprises one or more bridge guides that move forward and backward along a linear travel path and carry the corresponding movable gate chute therewith.

19. A system for use with a feed material, the system comprising:
a detector system comprising a plurality of radiation detectors;
a control system connected to the detector system;
a diversion system connected to the control system, the diversion system comprising a plurality of movable gate chutes, a plurality of linear motors, a first conveyor, and a second conveyor, each of the plurality of radiation detectors corresponding to a different one of the plurality of movable gate chutes, the plurality of linear motors each being configured to selectively position a corresponding one of the plurality of movable gate chutes in a retracted position or an extended position, the first conveyor being configured to carry, for each of any of the plurality of movable gate chutes in the retracted position, a first portion of the feed material to a first area, the second conveyor being configured to carry, for each of any of the plurality of movable gate chutes in the extended position, a second portion of the feed material to a second area, the second area being spaced apart from the first area; and
a material transport mechanism configured to transport the feed material past the detector system and to the diversion system, each of the plurality of radiation detectors being operable to detect, for the corresponding movable gate chute, a level of a contaminant in a corresponding portion of the feed material transported past the radiation detector by the material transport mechanism, the detector system being operable to transmit a plurality of signals to the control system, the plurality of signals comprising a signal for each of the plurality of movable gate chutes indicating the level of the contaminant detected for the movable gate chute,
the control system being operable, for each of the plurality of signals, to instruct the diversion system to (a) cause one of the plurality of linear motors to move the corresponding movable gate chute to the extended position when the level indicated by the signal transmitted for the corresponding movable gate chute exceeds predefined release criteria and the corresponding movable gate chute is in the retracted position, and (b) cause one of the plurality of linear motors to move the corresponding movable gate chute to the retracted position when the level indicated by the signal transmitted for the corresponding movable gate chute does not exceed the predefined release criteria and the corresponding movable gate chute is in the extended position.

20. The system of claim 19, further comprising:
a plurality of drive controllers each connected to a corresponding one of the plurality of linear motors, each of the plurality of drive controllers storing movement instructions that are executable by the corresponding linear motor, each of the plurality of drive controllers being configured to cause the corresponding linear motor to move the corresponding movable gate chute to the extended position or the retracted position by sending one or more of the movement instructions to the corresponding linear motor.

21. The system of claim 19, wherein each of the plurality of linear motors comprises one or more bridge guides that move forward and backward along a linear travel path and carry the corresponding movable gate chute therewith.

22. The system of claim 19, wherein each of the plurality of movable gate chutes (a) defines a through-channel, and (b) has an open top portion and at least one fin positioned along the open top portion, the at least one fin being configured to help guide the corresponding portion of the feed material into the through-channel defined by the movable gate chute.

* * * * *